Nov. 11, 1947.  KUAN-HAN SUN ET AL  2,430,540
CADMIUM-LANTHANUM-BORATE GLASS
Filed Aug. 9, 1946
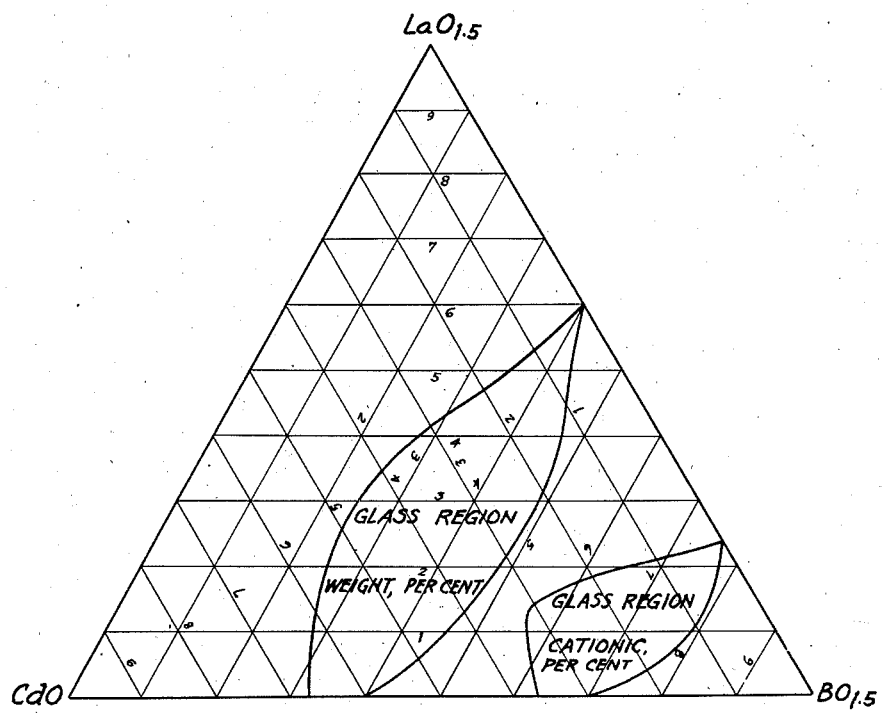
KUAN-HAN SUN
THOMAS E. CALLEAR
INVENTORS
ATTORNEY Patented Nov. 11, 1947

2,430,540

UNITED STATES PATENT OFFICE 2,430,540

CADMIUM-LANTHANUM-BORATE GLASS

Kuan-Han Sun and Thomas E. Callear, Rochester, N. Y., assignors to Eastman Kodak Company, Rochester, N. Y., a corporation of New Jersey Application August 9, 1946, Serial No. 689,532

7 Claims. (Cl. 106—47)

This invention relates to improved optical glass and particularly to cadmium-lanthanum-borate glass having a high refractive index and a moderate Abbe value.

Glasses having optical properties in these ranges are usually composed largely of relatively costly ingredients such as the oxides of lanthanum, thorium, and tantalum. We have found that by substituting cadmium in relatively large proportion, chemically durable optical glasses with similar refractive properties may be obtained.

The chief components in the present new glasses are the oxides of cadmium, lanthanum, and boron. We do not exclude the use in small amounts of other oxides known to be useful in glass compositions, and the examples given below include formulas with thorium or tantalum oxide.

The boundary lines of glass formation region of the system $CdO$—$LaO_{1.5}$—$BO_{1.5}$ are shown in the accompanying figure for both weight per cent and cationic per cent. In order to obtain optical properties in the useful field mentioned, the amount of cadmium oxide present should be greater than 5 weight per cent or 2 cationic per cent and of lanthanum oxide, greater than 5 weight per cent or 2 cationic per cent, the sum of the two being in all cases greater than 50 weight per cent or 20 cationic per cent. Since $La_2O_3$; $B_2O_3$, etc., are empirical formulas, it is equally expedient and more convenient, particularly in using cationic percentage or electropositive atomic percentage, to adopt the form $LaO_{1.5}$; $BO_{1.5}$, etc.

The following table gives three illustrative examples of glasses with their batch compositions in weight percentages (W) and cationic percentages (C):

|  | 1 | | 2 | | 3 | |
| --- | --- | --- | --- | --- | --- | --- |
|  | W | C | W | C | W | C |
| CdO | 41 | 25.6 | 34 | 22.1 | 31 | 18.8 |
| $LaO_{1.5}$ | 34 | 16.8 | 33 | 16.9 | 35 | 16.7 |
| $BO_{1.5}$ | 25 | 57.6 | 24 | 57.6 | 28 | 62.7 |
| $ThO_2$ |  |  |  |  | 6 | 1.8 |
| $TaO_{2.5}$ |  |  | 9 | 3.4 |  |  |
| $n_D$ | 1.7895 |  | 1.8132 |  |  |  |
|  | 44.4 |  | 42.5 |  |  |  |

The index of refraction for the D line ($n_D$) and the Abbe value ($\mu$) are given for two of the examples.

As is usual in glass making, various compounds other than the oxides may be used. For convenience, $CdCO_3$ and $H_3BO_3$ may be used for the components CdO and $BO_{1.5}$, respectively, and $LaO_{1.5}$ as such.

In making these glasses, the batch in powdered form is mixed uniformly and placed in a platinum vessel. The melting temperature is in the range 1200–1300° C. A fairly fluid liquid results after about a half hour for a melt of the order of 100 grams. The liquid may be shaken or stirred and poured into a mold previously heated to 400–600° C. and allowed to cool slowly. A clear, colorless glass which is durable against moisture attack is obtained.

Having thus described our invention, what we claim is:

1. An optical glass resulting from a batch over ninety per cent by weight or 95 cationic per cent, of which consists of the oxides of cadmium, lanthanum, and boron.

2. An optical glass resulting from a batch over ninety per cent by weight or 95 cationic per cent, of which consists of the oxides of cadmium, lanthanum, and boron each of said oxides being present in an amount greater than twenty per cent by weight.

3. An optical glass resulting from a batch over ninety per cent by weight or 95 cationic per cent of which consists of the oxides of cadmium, lanthanum, and boron, of which boron oxide is at least twenty-four weight per cent or 56 cationic per cent and cadmium and lanthanum oxides are each present in an amount greater than five weight per cent, or 3 cationic per cent.

4. An optical glass resulting from a batch containing by weight at least twenty-four per cent boron oxide and at least 5 per cent of each of cadmium and lanthanum oxides.

5. An optical glass resulting from a batch containing by weight at least twenty-four per cent boron oxide, at least 5 per cent of each of cadmium and lanthanum oxides, the total of the lanthanum and cadmium oxides being at least 50 weight per cent.

6. An optical glass resulting from a batch containing at least 56 cationic per cent boron oxide, at least 3 cationic per cent of each of cadmium and lanthanum oxides.

7. An optical glass resulting from a batch containing at least 56 cationic per cent boron oxide, at least 3 cationic per cent of each of cadmium and lanthanum oxides, the total of the lanthanum and cadmium oxides being at least 20 cationic per cent.

KUAN-HAN SUN.
THOMAS E. CALLEAR.